United States Patent
Howey et al.

(10) Patent No.: US 12,494,630 B2
(45) Date of Patent: Dec. 9, 2025

(54) DEVICE FOR HOLDING AND FASTENING A BUS BAR TO A SUBSTRATE, IN PARTICULAR TO A METALLIC HOUSING

(71) Applicant: Robert Bosch GmbH, Stuttgart (DE)

(72) Inventors: Friedrich Howey, Ditzingen (DE); Holger Dorn, Bietigheim-Bissingen (DE); Reinhard Schmid, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 18/262,430

(22) PCT Filed: Dec. 29, 2021

(86) PCT No.: PCT/EP2021/087777
§ 371 (c)(1),
(2) Date: Jul. 21, 2023

(87) PCT Pub. No.: WO2022/156999
PCT Pub. Date: Jul. 28, 2022

(65) Prior Publication Data
US 2024/0097420 A1    Mar. 21, 2024

(30) Foreign Application Priority Data
Jan. 21, 2021    (DE) ............... 10 2021 200 521.7

(51) Int. Cl.
*H02G 5/02*    (2006.01)
*H02G 5/10*    (2006.01)

(52) U.S. Cl.
CPC ............ *H02G 5/025* (2013.01); *H02G 5/10* (2013.01)

(58) Field of Classification Search
CPC .......... H02G 5/10; H02G 5/025; H02G 5/002; H02G 5/00; H02G 5/007; H02G 5/02;
(Continued)

(56) References Cited

U.S. PATENT DOCUMENTS 3,609,215 A * 9/1971 Giger, Jr. ............... H02G 5/007
                                                    174/88 B
3,647,937 A * 3/1972 Jorgensen .............. H02G 5/007
                                                    174/88 B
(Continued)

FOREIGN PATENT DOCUMENTS

DE    102006061924 A1    7/2008
EP        3736926 A1    11/2020
(Continued)

OTHER PUBLICATIONS

Translation of International Search Report for Application No. PCT/EP/2021/087777 dated Apr. 19, 2022 (2 pages).

*Primary Examiner* — Angel R Estrada
(74) *Attorney, Agent, or Firm* — Michael Best & Friedrich LLP

(57) ABSTRACT

The invention relates to a device for holding and fastening a bus bar (1) to a substrate (2), in particular to a metallic housing (10), having:
- a metallic supporting body (3) for supporting the bus bar (1) on the substrate (2),
- a thermally conductive and electrically insulating intermediate layer (4) for arrangement between the supporting body (3) and the substrate (2),
- a holding element (6) which can be fixed to the substrate (2) with the aid of a fastener (5), and
- a clamping and/or resilient element (7) for applying a preloading force to the supporting body (3) in the direction of the substrate (2) directly or indirectly via the holding element (6).

The invention also relates to a metallic housing (10) having a device according to the invention.

18 Claims, 5 Drawing Sheets

(58) Field of Classification Search
CPC .......... H01R 4/4848; H01R 4/48; H01R 4/38; H01R 4/4835; H01R 4/484
USPC .... 174/68.2, 149 B, 71 B, 72 B, 88 B, 70 B, 174/99 B, 149 R, 129 B; 439/877, 883, 439/884; 361/611, 624, 637, 648
See application file for complete search history.

(56) References Cited

U.S. PATENT DOCUMENTS

| | | | | |
|---|---|---|---|---|
| 4,684,191 | A * | 8/1987 | Feher | H01R 25/142 |
| | | | | 439/246 |
| 6,888,066 | B1 * | 5/2005 | Wiant | H02B 1/21 |
| | | | | 174/70 B |
| 7,335,041 | B2 * | 2/2008 | Haubach | H02G 5/025 |
| | | | | 174/70 B |
| 9,178,288 | B2 * | 11/2015 | Gao | H05K 3/325 |
| 2014/0360749 | A1 | 12/2014 | Gao et al. | |

FOREIGN PATENT DOCUMENTS

| | | | |
|---|---|---|---|
| GB | 932093 | A | 7/1963 |
| JP | S588644 | B2 | 2/1983 |
| JP | 2005088644 | A | 4/2005 |
| JP | 2006151124 | A | 6/2006 |
| KR | 101038564 | B1 | 6/2011 |

* cited by examiner

DEVICE FOR HOLDING AND FASTENING A BUS BAR TO A SUBSTRATE, IN PARTICULAR TO A METALLIC HOUSING

BACKGROUND

The invention relates to a device for holding and fastening a bus bar to a substrate, in particular to a metallic housing. The device can be used in any electrical component that has a bus bar, such as a power distribution unit of a fuel cell system. Furthermore, a housing with a corresponding device is proposed.

As part of the electrification of vehicles, various components are required that include electrical parts. These are usually connected to each other by means of bus bars due to the high currents involved. The bus bars, in turn, can have connections for high-voltage plugs to feed the current into an on-board electrical system.

To meet the general requirements for contact safety of components in vehicles, the bus bars must be electrically insulated from metallic housings or housing parts. In the prior art, this is usually realized by means of plastic bodies inserted between the bus bars and the metallic housings or housing parts to which the bus bars are attached. However, the plastic bodies have the disadvantage that they are not only electrically insulating, but also thermally insulating. This means that they hinder heat dissipation from the bus bars into the housing. This results in high temperatures in the bus bars and in the electrical components connected to them.

SUMMARY

It is therefore necessary to resolve the conflicting objectives of achieving electrical insulation between a bus bar and a metallic housing on the one hand, and ensuring sufficient heat dissipation from the bus bar into the housing on the other. The present invention is concerned with resolving this conflict of objectives. For the solution, the device for holding and fastening a bus bar and the housing are proposed.

Proposed is a device for holding and fastening a bus bar to a substrate, in particular to a metallic housing. The device comprises:
- a metallic supporting body for supporting the bus bar on the substrate,
- a thermally conductive and electrically insulating intermediate layer for arrangement between the supporting body and the substrate,
- a holding element which can be fixed to the substrate with the aid of a fastener, and
- a clamping and/or resilient element for applying a preloading force to the supporting body in the direction of the substrate directly or indirectly via the holding element.

The proposed device is characterized by the fact that it is made of multiple parts and the multiple parts—according to their respective function—are made of different materials. For example, the parts located between the bus bar and the substrate are made of materials that have high thermal conductivity to improve heat dissipation from the conductor rail to the substrate. The metallic material of the supporting body also ensures high strength. The thermally conductive and at the same time electrically insulating material of the intermediate layer ensures the required contact safety.

The parts of the proposed device that are provided in addition serve primarily to fasten the supporting body to the substrate. The supporting body, including the intermediate layer, is pretensioned against the substrate. The surface pressure created in this way ensures optimum heat transfer from the supporting body via the intermediate layer to the substrate.

The intermediate layer is preferably an electrically insulating thermally conducting foil, which is further preferably bonded to the supporting body and/or can be bonded to the substrate. When designed as an electrically insulating thermally conducting foil, the intermediate layer improves heat dissipation from the supporting body to the substrate. At the same time, the required electrical insulation is achieved. The proposed adhesive connection of the thermally conducting foil to the supporting body and/or the substrate facilitates the assembly of the device, since the intermediate layer cannot slip when the supporting body is fastened to the substrate.

The retaining element of the device is preferably also made of an electrically insulating material, for example plastic. The retaining element can thus be brought into contact with the supporting body on the one hand, and with the substrate on the other, without the required protection against contact being cancelled.

Preferably, the supporting body has a widened base that forms a flange for supporting the retaining element and/or the tensioning and/or spring element. The widened base increases the contact area with the substrate or with the intermediate layer and thus leads to a further improvement in heat dissipation from the supporting body to the substrate. The flange formed by the widened base also forms an optimum support surface for supporting the retaining element and/or the tensioning and/or spring element, so that the preloading force generated with the aid of the tensioning and/or spring element is introduced—directly or indirectly via the retaining element—into the flange of the supporting body.

The shape of the flange depends on the shape of the supporting body. For example, the supporting body may have a substantially rotationally symmetrical shape. The flange in this case is ring-shaped. Furthermore, the supporting body may have an elongated shape. In this case, two parallel flanges run along the two long sides of the supporting body.

An essentially rotationally symmetrical supporting body enables the bus bar to be supported in specific areas or at specific points. If support is to be provided over a longer section of the bus bar, multiple rotationally symmetrical supporting bodies can be used. Alternatively or additionally, an elongated supporting body can be used for support.

Since the flange and the retaining element ideally interact, it is proposed in further development of the invention that the retaining element is designed as a sleeve, in particular as a collar sleeve, or as an angle profile. A sleeve-shaped retaining element can be used in particular in conjunction with a ring-shaped flange or with a rotationally symmetrical supporting body. A retaining element designed as an angle profile is preferably used in conjunction with a straight flange of an elongated supporting body.

In order to fix the retaining element to the substrate with the aid of the fastening element, the design as a collar sleeve is advantageous. This is because the circumferential collar forms a surface for contact of the retaining element with the substrate. At the same time, the retaining element can be fastened to the substrate in the area of the circumferential collar. The collar preferably extends radially outward for this purpose. At the other end, a further circumferential collar can be formed, which preferably extends radially inwards. Via the further collar, the retaining element can be supported directly or indirectly via the tensioning and/or spring element on the supporting body, preferably on the ring-shaped flange of the supporting body.

Further preferably, the holding element has a recess for receiving the fastener. The recess is preferably formed in a section of the retaining element that runs parallel to the substrate, for example in a circumferential collar of the collar sleeve. The fastener can be, for example, a screw, bolt, rivet or pin. Preferably, multiple recesses are formed in the retaining element to accommodate multiple fasteners. The multiple recesses are preferably arranged at equal angular intervals or spacings.

Insofar as the fastening element is a screw, it is proposed as a further-forming measure that a metallic sleeve is inserted, preferably pressed, into the recess for receiving the fastener. The metallic sleeve counteracts loosening of the screw connection over time.

The tensioning and/or spring element further provided can in particular be a helical or disc spring. This can be arranged in such a way that it surrounds the supporting body. In this case, the flange is preferably rotationally symmetrical and has a ring-shaped flange. The helical or disc spring can be supported on the supporting body via the ring-shaped flange so that the supporting body is uniformly preloaded against the substrate in the circumferential direction. Alternatively, it is proposed that the tensioning and/or spring element is a bar, for example a spring-elastic bar. This can be brought into contact with a flange of an elongated supporting body in such a way that the supporting body is prestressed against the substrate. Preferably, a bar lies against a flange of the supporting body on each side of the elongated supporting body.

Further, preferably, the supporting body comprises an abutment surface facing away from the subsurface for abutting the bus bar. In the area of the contact surface, the supporting body forms a threaded bore for receiving a screw or a threaded pin for receiving a nut. The bus bar can thus be screwed to the supporting body. The screw connection allows a high surface pressure between the bus bar and the supporting body, so that heat dissipation from the bus bar into the supporting body is improved. Accordingly, at least one recess is provided in the bus bar for the screw or threaded pin to pass through.

Since the advantages of the invention are particularly effective when the substrate is formed by a metallic housing, a metallic housing with a device according to the invention for holding and fastening a bus bar is further proposed. The thermally conductive and electrically insulating intermediate layer of the device according to the invention ensures, on the one hand, optimum heat dissipation from the bus bar into the housing and, on the other hand, electrical insulation to meet the requirements for contact safety. By preloading the device against the housing, heat dissipation into the housing can be further improved.

According to a preferred embodiment of the invention, the housing has cooling, for example water or air cooling. This acts indirectly on the bus bar so that it is cooled via the housing.

BRIEF DESCRIPTION OF THE DRAWINGS

Preferred embodiments of the invention are explained in more detail below with reference to the accompanying drawing. These show.

DETAILED DESCRIPTION

Figure 1:
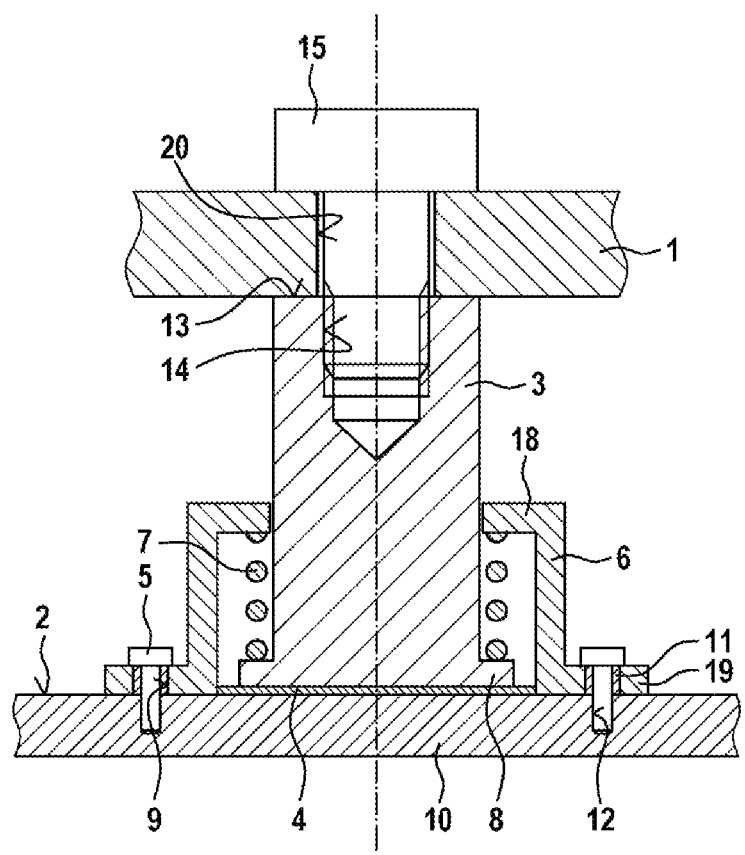
FIG. 1 a schematic cross-section through a device according to the invention for holding and fastening a bus bar according to a first preferred embodiment, FIG. 2 a schematic cross-section through a device according to the invention for holding and fastening a bus bar according to a second preferred embodiment, FIG. 3 a schematic cross-section through a device according to the invention for holding and fastening a bus bar according to a third preferred embodiment, FIG. 4 a sectional view of the device of FIG. 3 and FIG. 5 a top view of the tensioning and/or spring element of the device of FIG. 3.

The device shown in FIG. 1 is used to hold and fasten a bus bar 1 to a substrate 2, which in this case is formed by a metallic housing 10. The device comprises a metallic supporting body 3, which is rotationally symmetrical and supports the bus bar 1 in certain areas or at certain points. Several such devices are therefore preferably arranged at regular intervals along the length of bus bar 1.

The metallic supporting body 3 is separated from the substrate by a thermally conductive and electrically insulating intermediate layer 4 in the form of a thermally conductive foil. This ensures good heat transfer from the supporting body 3 into the housing 10. At the same time, electrical insulation is achieved so that the housing 10 can be touched without danger. Due to the elastic properties of the thermally conducting foil, geometric deviations in the area of the contact surface of the supporting body 3 on the housing 10 can also be compensated, so that maximum surface contact between the supporting body 3 and the housing 10 is ensured.

The metallic supporting body 3 is fastened indirectly to the housing 10 by means of a sleeve-shaped retaining element 6 and fastener 5 in the form of screws. The retaining element 6 interacts with a tensioning and/or spring element 7, which is designed as a helical spring and preloads the supporting body 3 against the housing 10. For this purpose, the tensioning and/or spring element 7 is supported on one side on an annular collar 18 of the sleeve-shaped retaining element 6 and on the other side on a ring-shaped flange 8 of the supporting body 3. The sleeve-shaped retaining element 6 is supported on the housing 10 via a further annular collar 19. Since the retaining element 6 is made of an electrically insulating material, for example plastic, electrical insulation between the holding element 6, the tensioning and/or spring element 7 and the supporting body 3 can be omitted. Metallic sleeves 11 for receiving screws are inserted in recesses 9 of the annular collar 19, which serve as fasteners 5 and are screwed to the housing 10. A threaded bore 12 is provided in the housing 10 for this purpose.

At the other end, the bus bar 1 rests on a contact surface 13 of the supporting body 3 and is screwed to the supporting body 3. A threaded bore 14 is provided in the supporting body 3 for this purpose, and the bus bar 1 has a recess 20 so that a screw 15 can be inserted or screwed into the threaded bore 14 through the recess 20.

Figure 2:
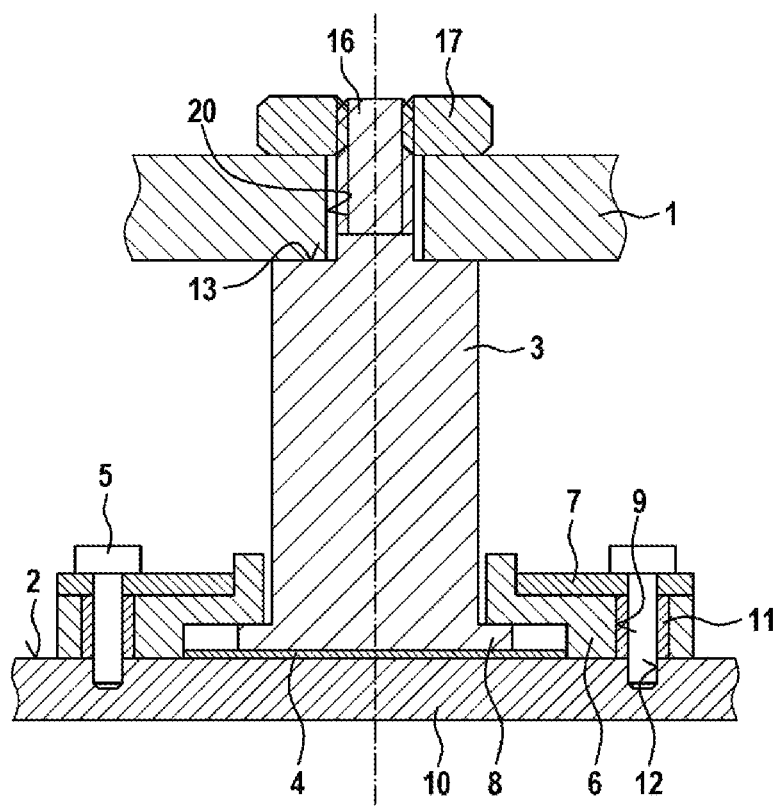

A further embodiment of a device according to the invention for holding and fastening a bus bar 1 to a substrate 2 is shown in FIG. 2. In this case, the supporting body 3 is designed as an elongated body that has two parallel flanges 8. A thermally conducting foil is again inserted between the supporting body 3 and the substrate 2 as a thermally conducting and electrically insulating intermediate layer 4. At the other end, the bus bar 1 rests on a contact surface 13 of the supporting body 3 and is screwed to the supporting body 3. However, the screw connection is implemented here with the aid of a threaded pin 16 of the supporting body 3 and a nut 17 attached or screwed on from the outside.

Corresponding to the elongated design of the supporting body 3, the retaining element 6 also has an elongated shape. A total of two elongated retaining elements 6 are provided, each of which is designed as an angle profile and is supported on a flange 8 of the supporting body 3. Furthermore, two tensioning and/or spring elements 7 are provided, which are designed as spring-elastic rails. The clamping and/or spring elements 7 rest on the retaining elements 6 and press them against the respective flange 8 of the supporting body 3. The supporting body 3 is thus indirectly preloaded against the housing 10 via the holding elements 6. The preloading force required for this is affected with the aid of the fastener 5, which are guided for this purpose by the tensioning and/or spring elements 7 and by the retaining elements 6 and are screwed into the housing 10.

For electrical insulation, the holding elements 6 are made of an electrically insulating material, for example plastic. Metallic sleeves 11 are again inserted in the retaining elements 6 to accommodate the fasteners 5.

The device of FIG. 2 also allows a bus bar 1 to be supported in areas on a substrate 2, wherein the support can extend over a greater length or over the entire length of the bus bar 1.

Figure 3:
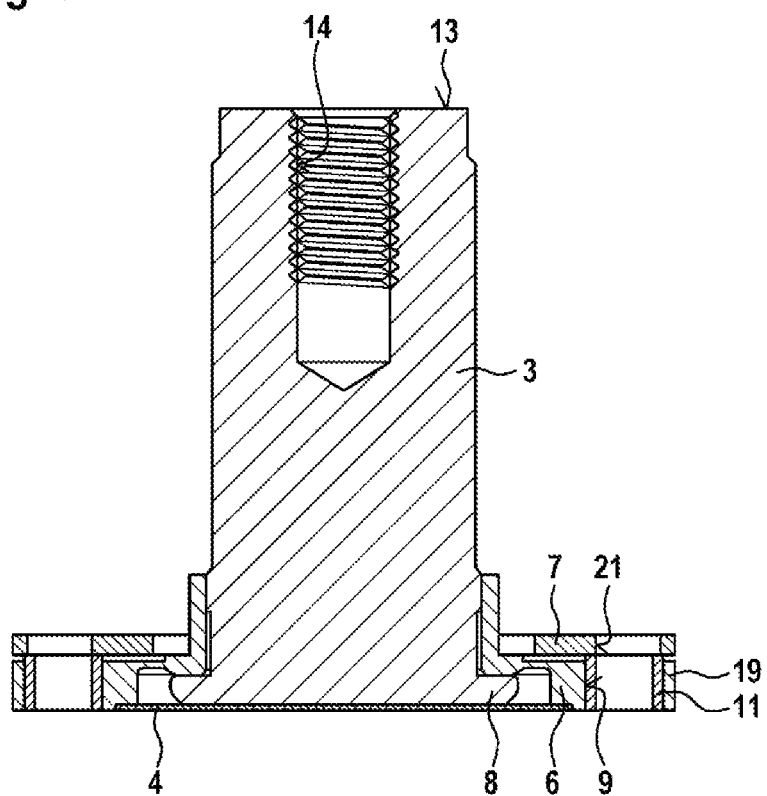
Figure 4:
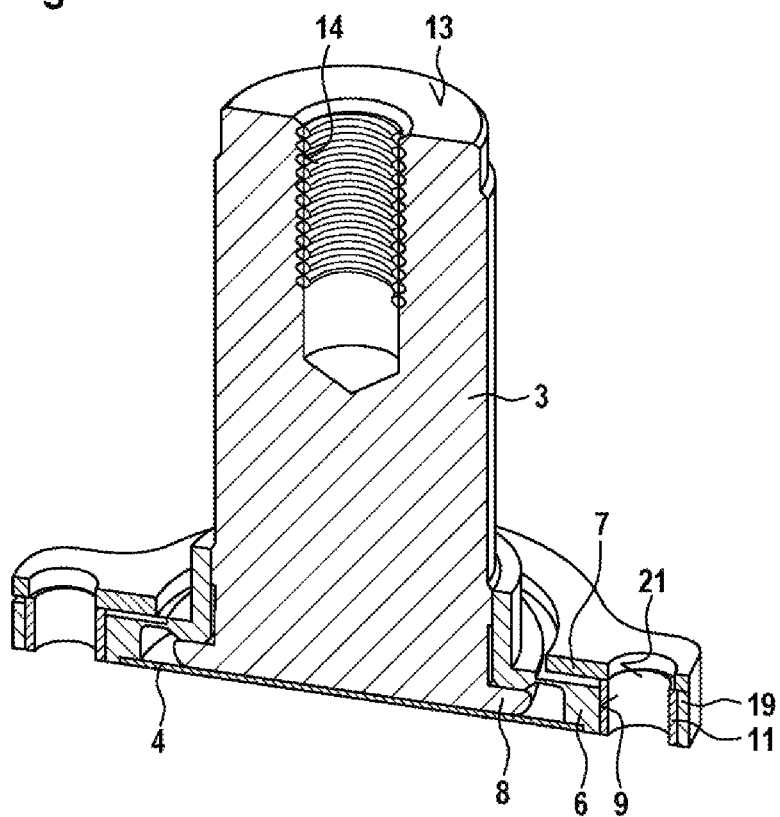
Figure 5:
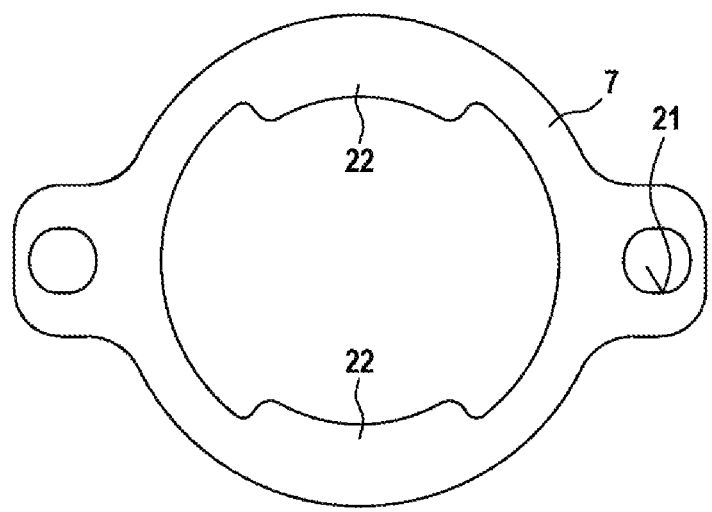

Another preferred embodiment of the device according to the invention is shown in FIGS. 3 to 5. The supporting body 3 is again rotationally symmetrical and has a ring-shaped flange 8. An electrically insulating intermediate layer 4 in the form of a thermally conducting foil is arranged below the supporting body 3. To accommodate a bus bar (not shown), the supporting body 3 has an abutment surface 13 with a threaded bore 14 formed therein. A sleeve-shaped retaining element 6 rests on the flange 8 of the supporting body 3 for fastening the supporting body 3 to a substrate (not shown). This is made of plastic, which means electrically non-conductive. It also has an annular collar 19 for securing the retaining element 6 to the substrate. For this purpose, two recesses 9 for receiving fasteners (not shown) are formed in the annular collar 19 at the same angular distance from each other. To prevent the fasteners from loosening, metallic sleeves 11 are inserted in the recesses 9. In the area of the recesses 9, the annular collar 19 widens radially outward in each case (see FIG. 4).

A tensioning and/or spring element 7 rests on the sleeve-shaped retaining element 6, which has essentially the same shape as the retaining element 6 in plan view (see FIG. 5). In particular, it has two recesses 21 which can be brought into overlap with the recesses 9 of the holding element 6 so that the fastener can be inserted therein. Furthermore, the tensioning and/or spring element 7 has two segment-shaped contact areas 22 (see FIG. 5), which can be brought into contact with the retaining element 6 so that the latter is pressed against the flange 8 of the supporting body 3. The supporting body 3 is thus prestressed against the substrate, so that heat transfer from the supporting body 3 to the substrate is improved.

What is claimed is:

1. A device for holding and fastening a bus bar (1) to a substrate (2), the device comprising:
   a metallic supporting body (3) for supporting the bus bar (1) on the substrate (2),
   a thermally conductive and electrically insulating intermediate layer (4) for arrangement between the metallic supporting body (3) and the substrate (2),
   a retaining element (6) which is fixed to the substrate (2) with a fastener (5), and
   a tensioning and/or spring element (7) for applying a preloading force to the metallic supporting body (3) in a direction of the substrate (2) directly or indirectly via the retaining element (6).

2. The device according to claim 1,
   wherein the thermally conductive and electrically insulating intermediate layer (4) is an electrically insulating thermally conducting foil.

3. The device according to claim 1,
   wherein the retaining element (6) is made of an electrically insulating material.

4. The device according to claim 1,
   wherein the metallic supporting body (3) has a widened base which forms a flange (8) for supporting the retaining element (6) and/or the tensioning and/or spring element (7).

5. The device according to claim 1,
   wherein the retaining element (6) is configured as a sleeve or as an angle profile.

6. The device according to claim 1,
   wherein the retaining element (6) has a recess (9) for receiving the fastener (5).

7. The device according to claim 1,
   wherein the tensioning and/or spring element (7) is a helical spring, disc spring, or a bar.

8. The device according to claim 1,
   wherein the metallic supporting body (3) has a contact surface (13) facing away from the substrate (2) for contacting the bus bar (1) and, in a region of the contact surface (13), forms a threaded bore (14) for receiving a screw (15) or a threaded pin (16) for receiving a nut (17).

9. A metallic housing (10) for holding and fastening a bus bar (1), wherein the metallic housing (10) comprises a device according to claim 1.

10. The housing (10) according to claim 9,
    wherein the metallic housing (10) has cooling.

11. The device according to claim 1, wherein the substrate (2) is a metallic housing (10).

12. The device according to claim 2, wherein the electrically insulating thermally conducting foil is bonded to the metallic supporting body (3) and/or to the substrate (2).

13. The device according to claim 3, wherein the electrically insulating material is plastic.

14. The device according to claim 5, wherein the sleeve is a collar sleeve.

15. The device according to claim 6, wherein a metallic sleeve (11) is inserted into the recess (9).

16. The device according to claim 15, wherein the metallic sleeve (11) is pressed into the recess (9).

17. The device according to claim 7, wherein the bar is a spring-elastic bar.

18. The housing (10) according to claim 10, wherein the cooling is water or air cooling.

* * * * *